Sept. 4, 1962 D. M. GOLDZWIG 3,052,322
SUPPLEMENTARY SUPPORTS FOR MOTOR VEHICLE LIFTS
Filed Sept. 14, 1959
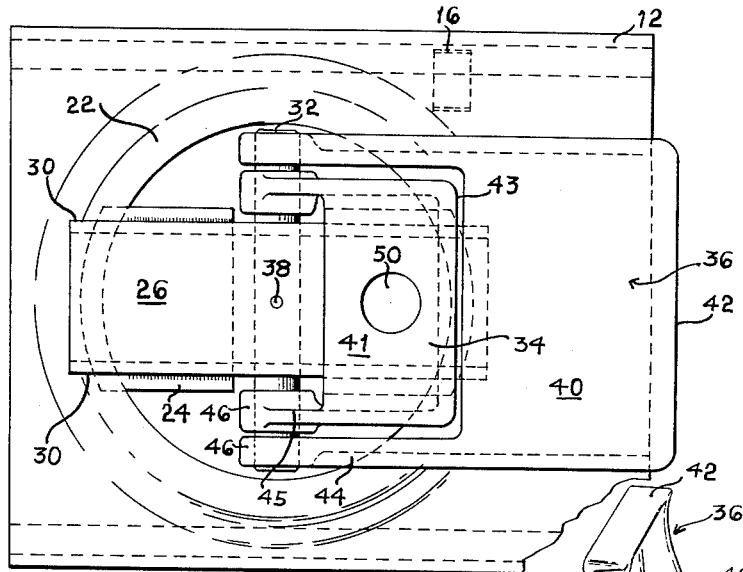
FIG. 1
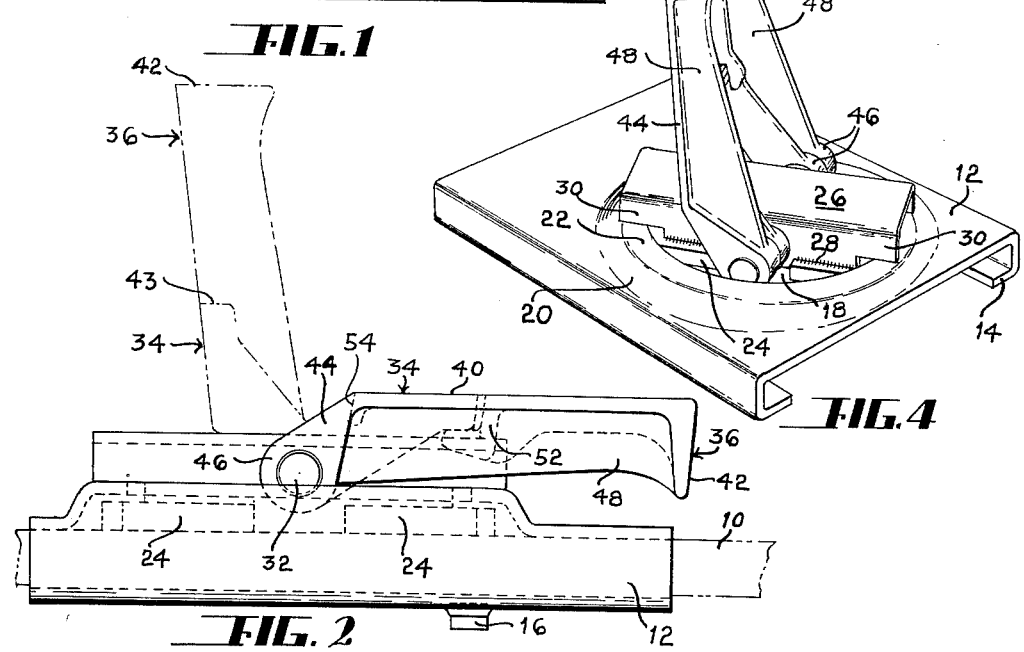
FIG. 2
FIG. 4
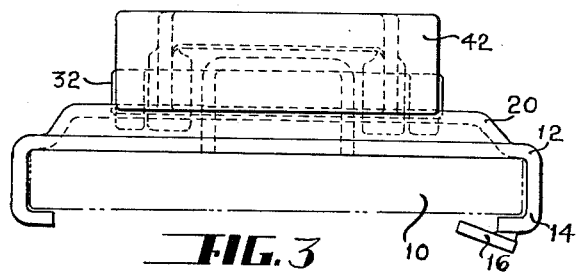
FIG. 3
INVENTOR.
David M. Goldzwig
BY
HIS ATTORNEYS

3,052,322
SUPPLEMENTARY SUPPORTS FOR MOTOR VEHICLE LIFTS

David M. Goldzwig, Dayton, Ohio, assignor to The Joyce-Cridland Company, Dayton, Ohio, a corporation of Ohio
Filed Sept. 14, 1959, Ser. No. 839,659
5 Claims. (Cl. 187—8.75)

This invention relates to a supplementary support for a motor vehicle lift. More particularly, this invention relates to a supplementary support for use with a lift provided with rails which engage the frame and which supplementary support provides a separation between the frame and the rail upon which it is mounted.

Conventional motor vehicle lifts are often provided with rails which may be stationary or adjustable and which may extend from a single post or a plurality of posts to engage the frame members of a motor vehicle, such as an automobile, a truck, a bus or a trailer. The posts are commonly hydraulically elevated so that the motor vehicle may be lifted to a considerable height permitting persons to walk under the motor vehicle and perform any operations desirable underneath thereof. Oftentimes, it is necessary to work upon the frame members or upon other parts near the frame members. Furthermore, there may be portions of the motor vehicle that are in the path of the rails and that will not support the weight of the motor vehicle. In any such situation, it is necessary to elevate the frame of the motor vehicle above the rails which normally contact the frame. In this manner, it is possible for the workman or mechanic to pass his hand between the lift rails and the frame of the motor vehicle. There may be many reasons for supporting the frame above the lift rails.

Accordingly, it is an object of this invention to provide a supplementary support which supports the frame of a motor vehicle above the lift rails which normally contact the frame thereof.

The lift rails often extend at angles to the frame so that only a portion of the rail normally contacts the frame. Since there are numerous sizes of frames which may vary widely between small, medium and large automobiles, trucks, buses, etc., it is necessary to provide adjustment of one type or another for supporting the frame. With this invention, the supplementary support structure is movable longitudinally of the rails so that the support may engage any of the various sizes of frames and also may engage different parts of the frame. The support may rest on top of the rail or may extend beyond the rail, thus increasing its effective length. Therefore, it is a further object of this invention to provide an auxiliary support which may be moved longitudinally of the lift rails to engage different sizes of frames or different portions of the motor vehicle frame.

Along with the longitudinal adjustment already described, it may be necessary to provide for an adjustment of the auxiliary support at angles other than the angle normally taken by the rails. Therefore, it is a further object of this invention to provide an auxiliary support for motor vehicle lifts which may be angularly displaced from the direction of the lift rails.

It has been found valuable to provide a support which may support the frame at varying heights above the lift rails. Different heights may be required due to different requirements as to the spacing between the lift rail and the frame. Under some circumstances, it may be necessary to pass tools between the lift rail and frame or for the mechanic to pass his hands between the rail and the frame. To accomplish this purpose, a plurality of pads are provided having at least three surfaces which may serve as load supporting surfaces. The pads are rotatably mounted so that a low position is provided, whereby a first supporting surface on each pad is parallel to the rail. A high position is provided by rotating all of the pads to a second position whereby the second supporting surface of the largest pad supports the load. Intermediate positions may be provided by rotating less than all of the pads. Generally it may be said that it is desirable that as few pads as necessary are used to keep the motor vehicle at the desired elevation. Accordingly, a further object of this invention is to provide an auxiliary support for lift rails which may be utilized to support a motor vehicle at varying heights above the rail.

Other objects and advantages reside in the construction of parts, the combination thereof, the method of manufacture and the mode of operation, as will become more apparent from the following description.

Referring to the drawings, FIGURE 1 is a top view of the auxiliary support device of this invention wherein two pads are shown, each pad being in the low position.

FIGURE 2 is a side view of the support of this invention. In this figure the high position of the pads is shown in dotted lines.

FIGURE 3 represents an end view of the support of this invention.

FIGURE 4 is a perspective view of this invention with the two pads in an elevated position.

The arms or rails 10 of a hydraulic automobile lift are shown in dotted lines in FIGURES 2 and 3. There are several such arms or rails. The rails may be attached to a central post or to several posts depending upon the type of automobile lift with which the support device of this invention is utilized. The rails or arms 10 are either fixedly or adjustably mounted upon the posts and normally engage the frame of a motor vehicle which is driven over the lift. To enhance the usage of prior lifts, an auxiliary support device is provided comprising a base member 12 which straddles a rail 10, as shown in FIGURES 2 and 3. The L-shaped side portions 14 of the base member 12 engage the side and bottom of rail 10 and enable the auxiliary support to be adjusted longitudinally thereof. An inwardly extending member 16 is provided on the bottom of one side portion 14 which may engage a suitable stop (not shown) on the bottom of rail 10. In this manner, it is possible to slide the support device partially past the end of the rail 10, so that the support device may act as a rail extension. The base member is further provided with an aperture 18 which is bounded by a raised periphery 20 having an annular flange 22.

A turret structure is swivelly mounted within the aperture 18 and coacts with the flange 22. The turret includes a pair of mounting blocks 24, the curved ends of which extend under diametrically opposed portions of the flange 22 and a channel-shaped member forming a pad support 26 attached to the mounting blocks 24 along weld lines 28. The opposite ends 30 of the pad support 26 overlie the flange 22. The clearance between the top of the mounting blocks 24 and the ends 30 of the pad support 26 is sufficient to enable the entire turret structure to swivel or rotate about an axis centrally of the aperure 18 so that the pads, which will be described below, may be adjusted angularly in respect to the rails 10.

A pin 32 is mounted transversely within the pad support 26 for mounting a pair of pads 34 and 36. The pin may be fixed in its position by any suitable means, such as spring lock pin or roll pin. The pad 36 includes a first load supporting surface 40 and a second load supporting surface 42. Likewise, the pad 34 includes a load supporting surface 41 and a second load supporting surface 43. It is to be noted that the load supporting surfaces 42 and 43 are only used when the pads 34 or 36, respectively, are raised into a substantially vertical position. In addition, each of the pads 34 and 36 includes legs 45 and 44, respectively, which extend at an angle to the first surface and have bearing portions 46 journalled about the pin 32. It should be noticed that the legs 44 of the pad 36 straddle the entire pad 34, so that the pad 34 is nested within the pad 36. To increase the strength of the pads 34 and 36, web portions 48 are fixed along the sides thereof. Aside from their difference in size, the pads 34 and 36 differ in that pad 34 is provided with an aperture 50, so that it may easily be grasped to be rotated independently of pad 36. Additionally, pad 36 is provided with a pair of hooks 52 which engage the bottom of the second load supporting surface 42 of pad 34 so that, when the pad 36 is rotated to an elevated position as shown in FIGURE 4, pad 34 will likewise be elevated.

As is clear from the drawings, the pads are rotatable from a low or folded position, as shown in FIGURES 1, 2, and 3. The low position is maintained by means of the hook 52 which also functions as a stop located below surface 40 of pad 36 which abuts the top of pad support 26. The elevated or upright position of pad 34 is determined by means of a stop 54 provided along the lower edge of surface 41 thereof. Since pad 34 rotates or is elevated as pad 36 is elevated, the stop 54 serves an identical function for the pad 36.

As clearly shown in the drawings, the load supporting surfaces 42 and 43 of the pads 36 and 34, respectively, meet at an angle of less than 90°. Also, it is clear that the lower edge of stop 54 is parallel with the supporting surface 42. By this structure, the pads may be rotated by more than 90° so that the pads, when elevated, are overcenter with respect to the pin 32. In this way, the pads are more stable when in an upright position and the possibility of an accidental pivoting of the pads to their lower or closed position is greatly reduced.

The operation of the device is believed obvious from the description just given. If it is desired to support the frame of an automobile above the rail 10 which normally engages it, the support structure is first placed upon the rail. As mentioned before, the support structure may be adjusted longitudinally of the rails 10. Further, the support structure may be adjusted to such an extent as to form an extension of the rails 10. Since the turret structure comprising the mounting blocks 24 and the pad support 26 may be swiveled within the aperture 18 by a full range of 360°, the supporting surfaces 40 and 42 or 41 and 43 may engage the frame at any angle. The pads themselves are rotatably mounted, so as to form three levels providing three different clearances between the load receiving surface and the rail 10.

Referring to FIGURE 2, the first level is shown in full lines. In this level, which may referred to as the low level or the closed or folded position, the first load supporting surfaces 40 and 41 of each pad lies parallel to the rail 10 and adjacent one to another. To achieve the highest upright or elevated position, the pad 36 is rotated about the pin 32 to the position shown by dotted lines in FIGURE 2, wherein the second load supporting surface 42 of the pad 36 lies parallel to the rail 10, the surfaces 40 and 41 again lying adjacent one another but at an acute angle to the rail 10. An intermediate position is achieved by raising the smaller pad 34 independently of the pad 36. That is to say, the pad 34 assumes the position shown in dotted lines in FIGURE 2, wherein its second load supporting surface 43 lies parallel to the rail 10 while the larger pad 36 remains in its lower position having its load supporting surface 40 parallel to the rail 10.

Thus, it is seen that the objects of this invention are carried out. Three-way adjustability is provided for the support device, in that the device may be moved longitudinally of the rail 10, the turret may be swiveled within the aperture 18 and the pads provide supporting surfaces which may support the motor vehicle frame at any one of three different levels above the rail 10. While two pads are shown in the drawings, it is obvious that three or more pads may be utilized to provide a plurality of intermediate positions.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A supplementary support for automobile lifts provided with lifting rails comprising: a base slidably mounted on one of said rails; a turret structure mounted upon said base and rotatable about an axis normal to said rail; a first and second pad mounted on said turret structure and pivotal about an axis parallel to said rail, each of said pads being provided with a first and a second load supporting surface, whereby said pads may occupy a low supporting position wherein the first supporting surface of each pad extends adjacent one to the other and parallel to the top surface of the rail, and a high supporting position wherein the second pad is pivoted to an upright position and the second load-receiving surface of the second pad extends parallel to the rail and in a load supporting position, and an intermediate supporting position wherein only the first pad is pivoted to an upright position, said first pad being provided with a stop which arrests rotation thereof when it reaches its upright position and said second pad being provided with means engaging the first pad which causes the first pad to rotate to an upright position when said second pad is so rotated, but which permits said first pad to be rotated to its upright position independently of said second pad.

2. The device of claim 1 wherein the second load supporting surface of each pad extends at an angle of less than ninety degrees from the first supporting surfaces, and each pad rotates more than ninety degrees to its upright position, whereby the first supporting surface extends over-center with respect to the parallel axis to prevent the pad from accidentally rotating out of its upright position.

3. A supplementary support for automobile lifts provided with lifting rails comprising: a base slidable on said rails; said base being provided with a raised portion having an annular flange defining a circular aperture; a turret structure located in the aperture consisting of a pair of mounting blocks, each extending under diametrically opposed portions of said flange, and a pad support attached to said blocks, whereby said turret may be rotated about an axis located centrally of the aperture; a pin journalled within said pad support, a first pad rotatably mounted upon said pin, a second pad rotatably mounted on said pin, said second pad being provided with an opening for receiving the first pad, each of said pads being provided with a first and a second load receiving surface, said pads being rotatable from a first load supporting position wherein the first supporting surface of the first pad lies adjacent the corresponding load supporting surface of the second pad, the adjacent surfaces extending parallel to the rail, to an upright position wherein the adjacent supporting surfaces extend at an angle to the rail and the second surface of the second pad extends parallel to the rail and in a load supporting position, and wherein an intermediate supporting position is provided by rotating only the first pad to an upright position.

4. The support of claim 3 wherein the first pad is provided with a stop which arrests rotation thereof when it reaches its upright position and the second pad is provided with means engaging the first pad which causes the first pad to rotate to an upright position when said second pad is so rotated, but which permits said first pad to be rotated to its upright position independently of said second pad.

5. In a supplementary support for automobile lifts, the combination comprising: a first and second pad each provided with two load supporting surfaces, both of said pads being pivotal about a common horizontal axis, whereby said pads may occupy a low supporting position wherein one of said supporting surfaces of both pads extends adjacent one to the other and in a substantially horizontal plane, and a high supporting position wherein the second pad is pivoted to an upright position wherein its other load supporting surface lies in a substantially horizontal plane, and an intermediate supporting position wherein only the first pad is pivoted to an upright position, said first pad being provided with a stop which arrests rotation thereof when it reaches its upright position and said second pad being provided with means engaging the first pad which causes the first pad to rotate to an upright position when said second pad is so rotated, but which permits said first pad to be rotated to its upright position independently of said second pad.

References Cited in the file of this patent

UNITED STATES PATENTS

| | | |
|---|---|---|
| 2,158,399 | Carter | May 16, 1939 |
| 2,899,020 | Halstead | Aug. 11, 1959 |
| 2,949,978 | Halstead | Aug. 23, 1960 |
| 2,958,395 | Wallace | Nov. 1, 1960 |

FOREIGN PATENTS

| | | |
|---|---|---|
| 1,143,700 | France | Apr. 15, 1957 |